United States Patent [19]

Bell

[11] Patent Number: 4,701,938

[45] Date of Patent: Oct. 20, 1987

[54] DATA SYSTEM

[75] Inventor: Clifford Bell, Darwen, England

[73] Assignee: Keystone International, Inc., Houston, Tex.

[21] Appl. No.: 794,091

[22] Filed: Oct. 31, 1985

[30] Foreign Application Priority Data

Nov. 3, 1984 [GB] United Kingdom ............... 8427872
Nov. 19, 1984 [GB] United Kingdom ............... 8429204

[51] Int. Cl.$^4$ ................................. H04L 27/00
[52] U.S. Cl. ............................ 375/36; 375/37; 328/185
[58] Field of Search ............... 375/7, 17, 36, 37, 55, 375/68, 121; 360/42; 328/35, 181, 183, 184, 185; 307/228, 263; 370/24

[56] References Cited

U.S. PATENT DOCUMENTS

| | | | |
|---|---|---|---|
| 3,048,784 | 8/1962 | Scherer | 375/37 |
| 3,649,845 | 3/1972 | Foch | 328/181 |
| 4,178,504 | 12/1979 | Farmer | 375/36 |
| 4,403,331 | 9/1983 | Halpern et al. | 375/37 |
| 4,550,306 | 10/1985 | Kimura | 375/36 |

*Primary Examiner*—Benedict V. Safourek
*Attorney, Agent, or Firm*—Browning, Bushman, Zamecki & Anderson

[57] ABSTRACT

A data system for transmitting multi-state data streams between a data transmitting station (1,10) and a data receiving station (2), coupled together by a data transmission line (3). Associated with the data transmitting station (1,10) is an encoder (10) for encoding the data stream prior to transmission and associated with the data receiving station (2) is a decoder (23,24) for decoding the received signals.

The encoder (10) comprises signal generating means (15,16,17) which selectively generates a first waveform (FIG. 2(b) (i)) corresponding to the integral of a positive pulse having a negative d.c. offset and a second waveform (FIG. 2(b) (ii)) corresponding to the integral of a negative pulse having a positive d.c. offset. The time average of each waveform and its associated d.c. offsets is substantially zero. The encoder (10) further comprises means (18) for reading the multi-state data stream and for outputting a composite waveform onto the data transmission line (3) consisting of a respective combination of the first and second waveforms for each state read from the multistate data stream.

The decoder (23,24) comprises a differentiating circuit.

23 Claims, 14 Drawing Figures

DATA SYSTEM

The present invention relates to a data system and, in particular, to a data system comprising a central station and a plurality of individually addressable remote stations. More specifically the present invention relates to a data system for and a method of encoding and decoding multiple state data signals for transmission between the central station and at least one of the remote stations.

In a data system of this type data signals may be transmitted from the central station to each of the remote stations and from a remote station to the central station. The present invention also relates to a system which allows simultaneous transmission of data between the central station and a remote station and vice versa.

In order to be able to read data transmitted between the central station and the remote stations each station receiving data must be operated in synchronism with the data transmission rate. To this end the present invention further provides a system for synchronising the receiving stations to operate at the same rate as the data transmission rate.

The present invention is described throughout the specification with reference to a process installation of the type which may be used to control such operating conditions as pressure, flow rate, temperature, fluid transfer rate, etc. Control of these operating conditions is achieved by means of valve actuators which are controlled from a central process controller. The process controller may be regarded as a central station and each of the valve actuators as a remote station. This is not intended to limit the scope of the present invention which has application in any situation where data is required to be transmitted between a plurality of stations connected together by a data transmission line.

It is known to control valve actuators within a process installation by separately wiring each actuator to a central process controller, which may or may not comprise a microprocessor. The process controller monitors the operating conditions of the process, i.e. pressure, flow rate, temperature, fluid transfer rate, etc, by means of sensors located around the process installation and sends control signals to the actuator responsible for varying a particular operating condition by means of wires dedicated to that actuator. The actuator varies the position of a valve in accordance with the signal provided by the process controller to vary the operating condition affected by that valve.

Usually it is necessary to provide the process controller with feedback signals relating to the status of the valve actuator, such as its actual position, whether it has reached the end of its travels, whether it is operating correctly, etc. In this case additional wiring must be provided between the actuator and the process controller to carry this feedback from the actuator.

In a conventional process installation the control system may comprise anything from four to seven wires extending between the process controller and each valve actuator. This means that a considerable proportion of the costs of a control system are incurred on wiring alone. Moreover, because of the extensive wiring looms which have to be laid for these conventional control systems much of the time spent con commissioning the system is spent simply laying and tagging wires, and then tracing and correcting wiring faults.

In order to overcome the problems associated with the conventional control system described hereinabove it is known to provide a digital system in which each valve actuator is assigned a unique digital address. This digital address is conveniently held in a dedicated on-board microprocessor associated with the actuator. A single data transmission line runs from the process controller and each microprocessor is connected into this data transmission line. Data from the process controller is prefixed with the unique address of the actuator for which it is intended prior to transmission on the data transmission line. The data on the data transmission line is examined by all of the microprocessors, but is only passed on to the microprocessor having the same unique address as that starting the message. The data is then processed within the microprocessor.

Data can also be transmitted from an actuator to the process controller using this technique, by providing the process controller with its own unique address and each actuator with the means to address, encode and transmit data.

The data to be transmitted between the actuators and the process controller is generally comprised of a binary bit data stream. It is not usually possible to transmit this data in its raw form of pulses and spaces, as data in this form is particularly susceptible to corruption by electrical noise within the system. To avoid this the data is usually encoded prior to transmission.

Various encoding techniques are known for the transmission of serial binary bit data on a data transmission line. However, these techniques broadly fall into two categories, these being frequency shift keying (F.S.K.) and pulse code modulation (P.C.M.).

Frequency shaft keying makes use of different sine-wave frequencies to represent logic bits "1" and "0". Being pure sinewaves no harmonics are produced and since there is no D.C. component the signals can pass through A.C. coupled circuits substantially unimpeded. Moreover, line reflections are less of a problem and numerous actuators can tap off the data transmission line without adversely affecting the data signal.

However, F.S.K. signals require a considerable amount of the actuators processor time to be spent on decoding the encoded data. This presents real problems in a multi-actuator system, as every message on the data transmission line must first be encoded before the address prefixing it can be checked with the address of the actuator reading it. With so much time required to be spent on decoding every data transmission little is left for the actual processing of data once it reaches the actuator for which it is intended.

Pulse code modulation makes use of time differences between pulses to represent logic bits "1" and "0". Little of the actuators processor time is required to be spent on decoding data signals encoded using this technique. Moreover the use of a pulse detector having a narrow sampling window to detect the P.C.M. encoded signals ensures high degree of immunity to multipath line reflections, because only those pulses occurring during the sampling time interval will be detected, whilst spurious electrical noise occurring outside the sampling window will be ignored.

However, P.C.M. techniques do require the use of wide bandwidth circuits because of their high harmonic content and are therefore susceptable to electrical interference and noise. The level of electrical interference in industrial environments is invariably high, is mainly impulsive and covers a wide spectrum of frequencies.

Moreover, because of the long cable runs which have to be provided between the process controller and the actuators this electrical noise is invariably induced onto the data transmission line to the detriment of data integrity.

It is usually a requirement of the control system that data be transmitted from the actuators to the process controller, as well as vice versa. In addition to allowing the process controller to monitor the position of any given valve, it also allows checks to be made on the actuator and its operating status.

Conventional two way data transmission relies on either a second data transmission line being provided to carry data from the actuators to the process controller, which adds significantly to costs, or on a single data transmission line being on a time shared basis, which considerably complicates the system. In both solutions the process controller must be provided with data receiving and decoding means and the actuator must be provided with encoding and transmitting means. As the data is usually amplified prior to transmission to minimise the effect of electrical noise power consistent with the power content of the encoded signal must be made available at the valve actuator. Large power supplies require large transformers which gives rise to bulky and expensive valve actuators. Furthermore, many process installations deal with highly inflammable substances, and under these circumstances the presence of high voltages in the vicinity of the valve actuator may be unacceptable for safety reasons. In addition, where two way data transmission is achieved by time sharing the same data transmission line, means must be provided at the valve actuator for storing data until the data transmission line is free.

In order to be able to read data transmitted between the central process controller and each of the remote stations it is essential that the data read rate of each station receiving data corresponds to the data bit transmission rate of the data on the data transmission line. Generally the data bit transmission rate and the data read rate of a station receiving data, determined by the microprocessor clock rate, are incompatible, despite the fact that both are usually derived from high accurate and stable crystal oscillators which are designed to run at the same frequency. As a consequence the data read rate of each station must be synchronised to the data bit transmission rate. This can be achieved by introducing wait loops into the microprocessor programme or providing a separate asynchronous communication chip (UART). The former solution wastes much valuable programme execution time, whilst the latter solution results in an increase in the costs of the control system.

It is an object of the present invention to provide a data system comprising means for encoding and decoding multiple state data for transmission between a plurality of stations connected together by a data transmission line, which is not susceptable to data corruption and which occupies a relatively narrow frequency bandwidth.

It is still a further object of the present invention to provide a system which allows simultaneous transmission of data between a central station and a remote station and vice versa, which obviates the need to provide a separate power supply at each remote station to drive data transmission from the remote station to the central station.

It is yet a further object of the present invention to provide a system for synchronising the data read rate of a data receiving station to the data transmission rate of data on the data transmission line, which obviates the need to provide highly accurate crystal oscillators running at the same frequency at both the data transmitting and data receiving ends of the control system.

According to a first aspect of the present invention there is provided a data system for transmitting multi-state data, said data system comprising a data transmitting station and at least one data receiving station, processor means providing a multiple state data stream for transmission between the stations, a data transmission line coupling the stations together, encoder means provided in the data transmission station for encoding the data stream prior to transmission and decoder means provided in each of the receiving stations for decoding the received signals, characterised in that the encoder comprises signal generating means for selectively generating a first waveform substantially corresponding to the integral of a positive pulse having a negative d.c. offset and a second waveform substantially corresponding to the integral of a negative pulse having a positive d.c. offset, the time average of each pulse and its associated d.c. offset being substantially zero, means for sequentially reading each bit of the binary data stream and means for outputting onto the data transmission line a composite waveform consisting of a respective combination of the first and second waveforms for each of the states read from the data stream, and the decoder comprises differentiating means for differentiating said composite waveform on the transmission line to derive a bidirectional pulse train representing the multiple state data stream.

Preferably, the stations comprise a central station controlling a process and a plurality of remote stations each controlling respective actuator means determining the operating conditions of the process in accordance with control signals from the central stations. To enable the central station to address control signals to a particular remote station each remote station is provided with a unique digital address and data from the central station to that remote station is prefixed with its address prior to transmission. The address is in digital form and forms a part of the data stream. Accordingly it is encoded and decoded in accordance with the present invention.

Preferably, each station comprises switching means whereby its address can be preset and adjusted.

It is usual for each actuator to be associated with a sensor which senses the operating condition of the process controlled by the actuator and provides feedback to the central station. The sensor may be regarded as yet another remote station which can be interrogated by the central station and can provide data relating to its status and the operating condition which it senses. In such a control system it is necessary that the remote stations comprising actuators and the remote stations comprising sensors transmit data to the central station. This data may comprise information relating to the condition of the actuator or sensor, the actuator's position, the value of the sensed condition etc. This may be achieved by duplicating the encoder of the present invention in the remote station and the decoder of the present invention in the central station. Alternatively, and more desirably the two way communication system of the fourth aspect of the present invention may be employed.

Preferably, the multiple state data stream comprises a binary bit data stream and the outputting means comprises means for outputting a first combination of said first and said second waveforms for each logic bit "1" read from the data stream, and a second combination of said first and said second waveforms, differing from said first combination, for each logic bit "0" read from the data stream.

The signal generating means may comprise a memory in which the instantaneous values of at least one of the said first and second waveforms are stored and means for scanning out the instantaneous values. Where the instantaneous values are held in the memory in digital form they are converted to analogue signals via a digital to analogue convertor. The first and second waveforms may each be stored in a respective page of the memory and the means for reading out the appropriate waveform onto the data transmission line comprises switching means which switches between the two pages of the memory under the control of the data bit level read from the data bit stream. Alternatively, the memory may hold only one of the said first and said second waveforms, the other waveform being derived by inverting the said waveform output from the memory.

As an alternative to the above the signal generating means may comprise a continuous pulse train generator means for integrating the continuous pulse train to produce a triangular waveform, inverter means for inverting the triangular waveform and switching means for switching between the output of the integrating means or the output of the inverter.

Preferably, the pulse train signal generating means comprises a Schmitt trigger the output of which is switched by the triangular waveform output from the integrator.

Preferably, the signal generating means further comprises phase locking means for synchronising the signal generating means to the system clock.

Preferably, a wait state precedes each first and second waveforms. This wait state is preferably comprised of a period of zero volts at the beginning of each first and second waveform. This allows switching between the first and second waveforms to be carried out during a safe period of no signal.

This signal generating means may be switched between the first and second waveforms by the data stream directly, or may be switched by a modified waveform representing the data stream. This latter switching method is employed where it is required to represent each state with a respective combination of said first and second waveforms consisting of more than just one of the two waveforms.

Preferably, the data transmission line comprises at least two wires and encoded data is transmitted on both wires in push-pull mode, that is the signal on each wire is the mirror image of the signal on the other wire. The encoder may be coupled to the two wires of the data transmission line by means of a centre tapped transformer. Alternatively, a push-pull amplifier arrangement may be coupled between the output of the encoder and the two wires of the data transmission line. In both cases the level of signal output to the data transmission line is preferably comparatively high, being of the order of several tens of volts, so as to remain substantially unaffected by any electrical noise or interference induced onto the transmission line.

Preferably, the differentiating means comprises a resistor-inductor network connected across the output of the data transmission line. Conveniently, the inductive element of the resistor-inductor network comprises the primary winding of a transformer coupling the data receiving station to the data transmission line.

It will be realised that other differentiation circuits may be employed besides the resistor-inductor network. For example, a capacitive circuit may be employed. The output of the capacitor may be coupled to the remote station by a pair of opto-couplers one of which is turned on for each positive going pulse and the other of which is turned on for each negative going pulse.

Preferably, half wave rectifier means are provided at the output of the differentiating means to derive a unidirectional pulse train corresponding to the data stream.

Preferably, full wave rectifier means are provided at the output of the differentiating means to derive a clock signal the frequency of which is directly proportional to the data bit transmission rate.

In a first preferred embodiment of the present invention the said first combination is comprised of a respective one of the said first and second waveforms and the second combination is comprised of the other one of said first and said second waveforms. With these waveforms the output of the half wave rectifier corresponds to the data stream provided by the processor means without need for further processing.

In a second preferred embodiment of the present invention one of said first and second combinations is comprised of the first waveform followed by the second waveform and the other of said first and second combinations is comprised of the second waveform followed by the first waveform. With this arrangement of combinations every evenly occurring pulse occurring in the output of the half wave rectifier corresponds to one logic level and every oddly occurring pulse corresponds to the other logic level bit. Thus the data stream provided by the processor is derived from the output of the half wave rectifier by sampling either every evenly occurring pulse or every oddly occurring pulse according to a predetermined convention.

In the second preferred signal generating arrangement the output of the full wave rectifier is a pulse train of twice the data bit transmission rate and the output of the half wave rectifier includes a pulse for each bit of data transmitted in the data stream. It will be realised that the number of pulses in the pulse train output from the full wave rectifier will be twice the number of pulses output from the half wave rectifier if all of the data bits have been transmitted without corruption. This can be used to verify the integrity of the data received from the data transmission line.

In a first data verifying means a first counter counts the total number of pulses output from the half wave rectifier, a second counter counts the total number of pulses output from the full wave rectifier, and a comparator compares the counts in the first and second counters and confirms the verity of the data only if the number in the first counter is half that in the second.

In a second data verifying means a first serial store stores the even bits occurring in the output of the half wave rectifier, a second serial store stores the odd bits occurring in the output of the half wave rectifier, an inverter inverts the bit word stored in one of the two serial stores to derive the compliment thereof and a comparator compares the output of the inverter with the bit word stored in the other serial store and confirms the verity of the data only if the compared words are identical.

Preferably, a pulse train of half the frequency of the pulse train output from the full wave rectifier is applied to the first and second serial stores to synchronise the sample rates of the first and second serial stores to the data bit stream output from the half wave rectifier.

To ensure that the data verifying means carries out each data verification correctly each data stream is preceded by a data start signal.

The pulse train output from the full wave rectifier is twice the frequency of the data bit transmission rate and may be employed to synchronise the data read rate of the data receiving station to the received data stream.

Preferably, there is provided a system for synchronising the data read rate of a data receiving station to the received data stream, comprising means for deriving a pulse train of half the frequency of the pulse train output from the full wave rectifier, a voltage controlled oscillator the output of which determines the clock frequency for the data receiving station, and comparator means for comparing the output of the voltage controlled oscillator with the pulse train output from the divider to produce an error voltage proportional to the phase difference between the two signals, which error voltage is applied to the voltage controlled oscillator to synchronise the clock frequency of the data receiving station with the data transmission rate.

Using this synchronising system drift in the timing of the transmitted data stream is no longer critical as the phase locked oscillator will adjust its output to accommodate the new timing.

Preferably, the data receiving station comprises frequency dividing means to divide the frequency of the voltage controlled oscillator so as to substantially correspond with the frequency of the data bit transmission rate. This frequency divider may be provided by the internal divider/counter of the data receiving station microprocessor.

Preferably, a continuous stream of bits is provided by the data transmitting station during periods when there is no data stream to be transmitted to ensure that the data receiving stations are always provided with a synchronising clock pulse train.

Preferably, where the control system is employed in a process installation each remote station controls a motor which controls a process operating condition.

Preferably, the remote station provides a deadband which prevents the motor from hunting for a required position.

According to a second aspect of the present invention there is provided an encoder for encoding a multi-state data stream for use in the data system according to the first aspect of the present invention comprising signal generating means for selectively generating a first waveform substantially corresponding to the integral of a positive pulse having a negative d.c. offset and a second waveform corresponding to the integral of a negative pulse having a positive d.c. offset, the time average of each pulse and its associated d.c. offsets being substantially zero, means for sequentially reading each bit of a data bit stream, and means for outputting onto a data transmission line a composite waveform consisting of a respective combination of the first and second waveforms for each of the data state read from the multistate data stream.

According to a third aspect of the present invention there is provided a decoder for decoding encoded multi-state data streams for use in a data system according to a first aspect of the present invention comprising differentiating means for differentiating the encoded signals on a transmission line to derive a bi-directional pulse train representing the multi-state data stream.

According to a fourth aspect of the present invention there is provided a system for transmitting data stream comprising not more than three states between a pair of stations coupled together by a data transmission line comprising a three wire bus, characterised in that the data transmitting station comprises means for providing a binary bit data stream, a pair of normally open switches, each connected between one of said three wires and a respective one of the two remaining wires, means for sequentially reading each bit of the data stream and control means for closing one of the two switches for each first data state read from the data stream, the other of the two switches for each second data state read from the data stream and for opening both switches for each third state read from the data stream, and that the data receiving station comprises means for providing two continuous and differing signals, each of which is output to a respective one of the two remaining wires, means for identifying which of the two signals is reflected on the said one wire to determine which switch is closed, and means for generating the data stream at the data receiving station from the sequence in which the two switches are opened and closed.

Preferably, each of the switches comprises an optical switch and the control means comprises a pair of light emitting diodes, each of which is optically connected to a respective one of the optical switches and is driven by the means for sequentially reading the data stream so that one of the light emitting diodes is turned on each time a first logic state is read from the data stream, the other light emitting diode is turned on each time a second logic state is read from the data stream and neither light emitting diode is turned on for each third logic state read from the data stream.

Preferably, the pair of continuous and differing signals are mirror images of each other.

Preferably, the signal on one of the two wires at the data receiving station and the signal reflected on the said one wire is compared with this signal to determine whether it is the same, which indicates closure of one of the switches, or different, which indicates closure of the other switch.

Preferably, the continuous signal generated at the data receiving station is data for transmission to the data transmitting station, which is encoded in accordance with the method of the fifth aspect of the present invention, thereby affording simultaneous two way transmission of data between the stations.

According to a fifth aspect of the present invention there is provided a method of encoding and decoding a multi-state data stream in a control system comprising a data transmitting station and at least one data receiving station coupled to the data transmitting station by a data transmission line, characterised in that data stream is encoded by generating a first waveform corresponding to the integral of a positive pulse having a negative d.c. offset and a second waveform corresponding to the integral of a negative pulse having a positive d.c. offset, the time average of each pulse and its associated d.c. offset being substantially zero, each bit of the data stream is sequentially read and a composite waveform consisting of a respective combination of the first and second waveforms is output to the data transmission line for each of the states read from the data stream, and data is decoded by differentiating the composite waveform on the transmission line to derive a bi-directional pulse train representing the multi-state data stream.

Preferably, each station is assigned a unique digital address and the data stream is allocated to a particular receiving station by prefixing the data stream with this address.

In one preferred embodiment of the present invention the said first combination is comprised of a respective one of said first and second waveforms and the second combination is comprised of the other one of said first and second waveforms.

In a second preferred embodiment of the present invention one of the said first and second combinations is comprised of the first waveform, followed by the second waveform and the other one of said first and second combinations is comprised of the second waveform followed by the first waveform.

Embodiments of the present invention will now be described, by way of example, with reference to the accompanying drawings, in which.

Figure 9A:
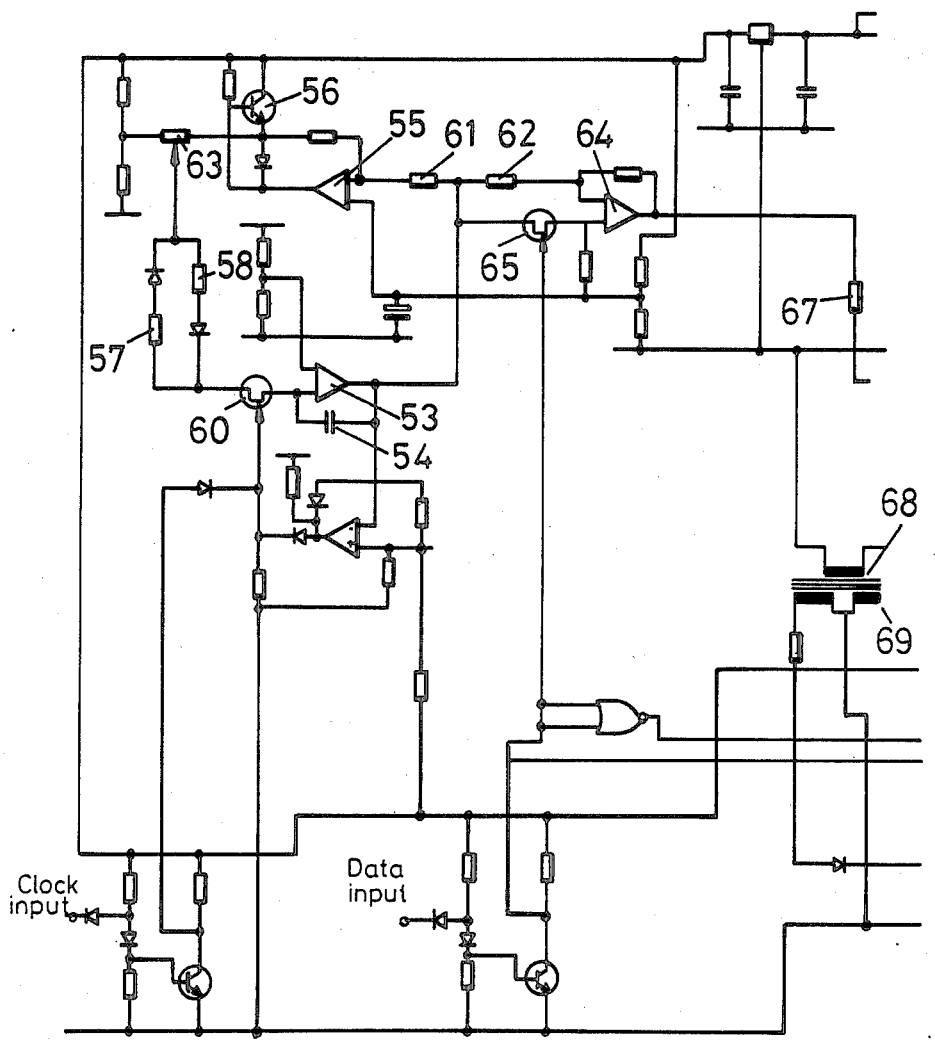
Figure 9B:
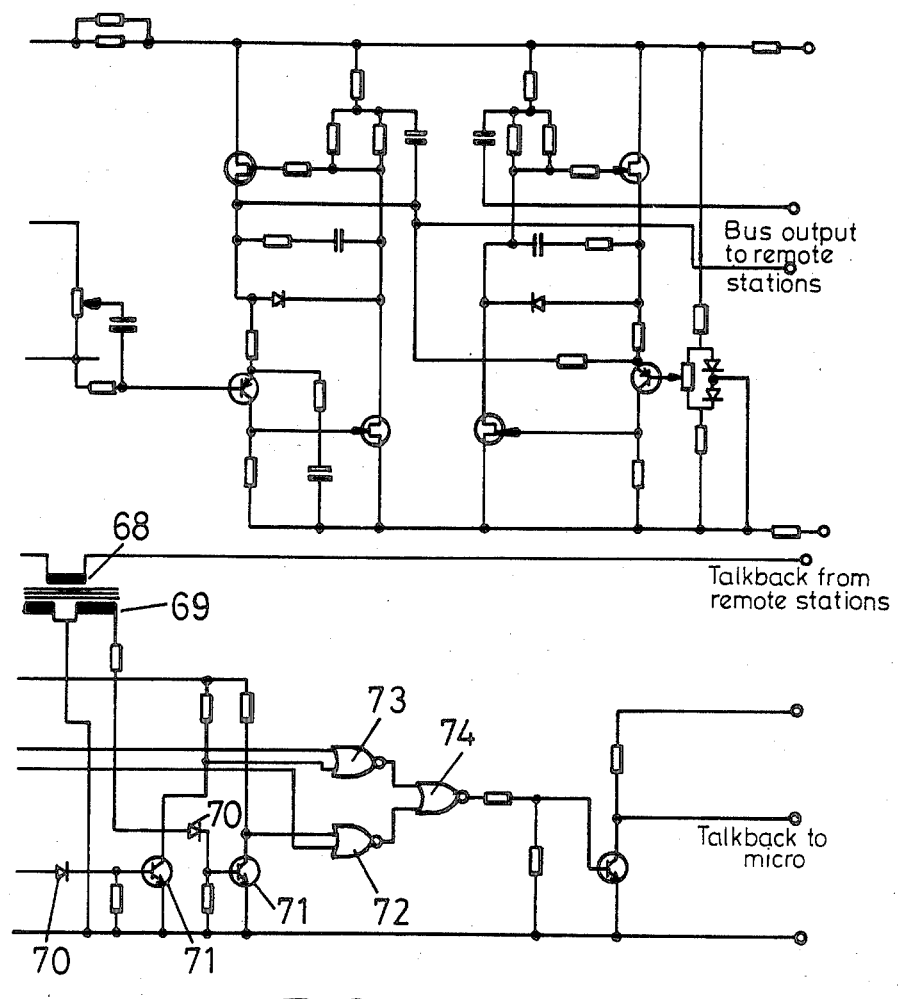
Figure 10A:
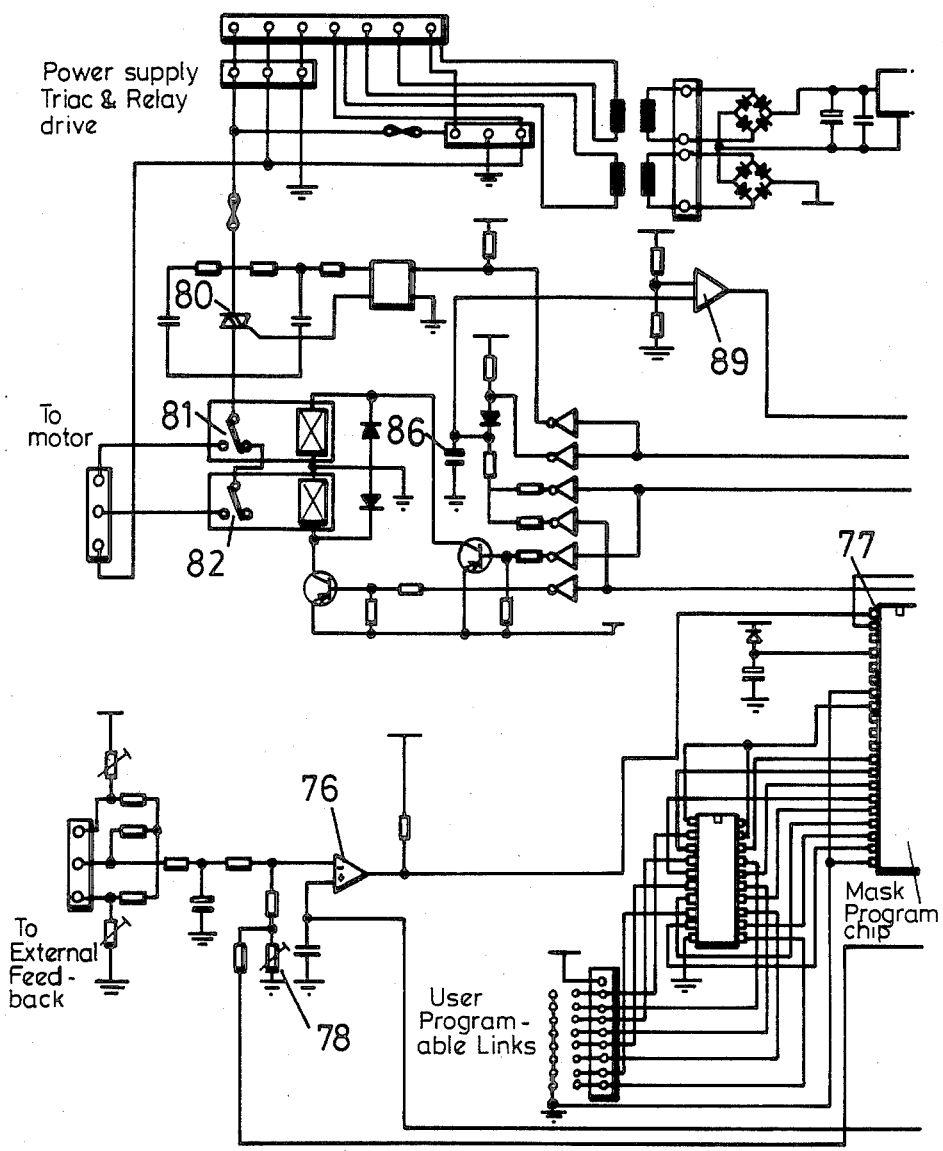
Figure 10B:
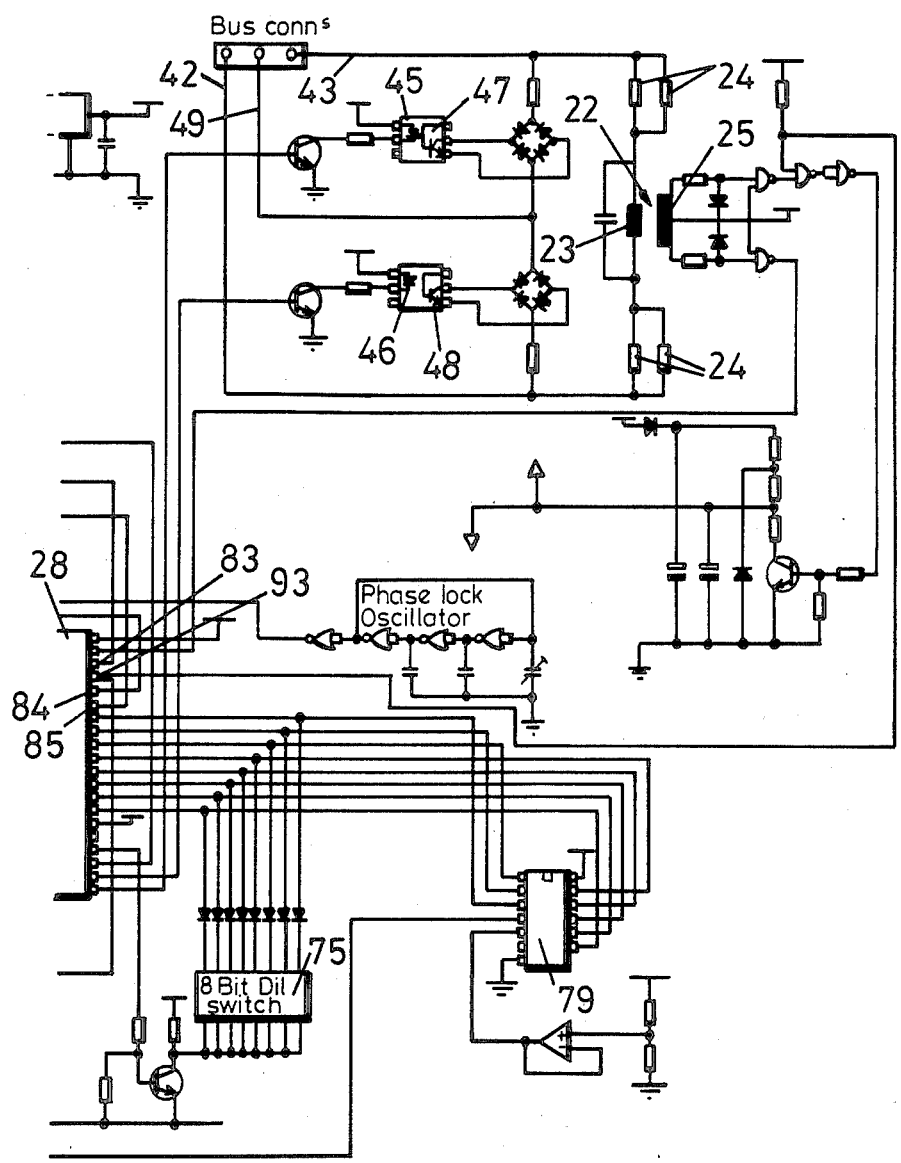
Figure 11A:
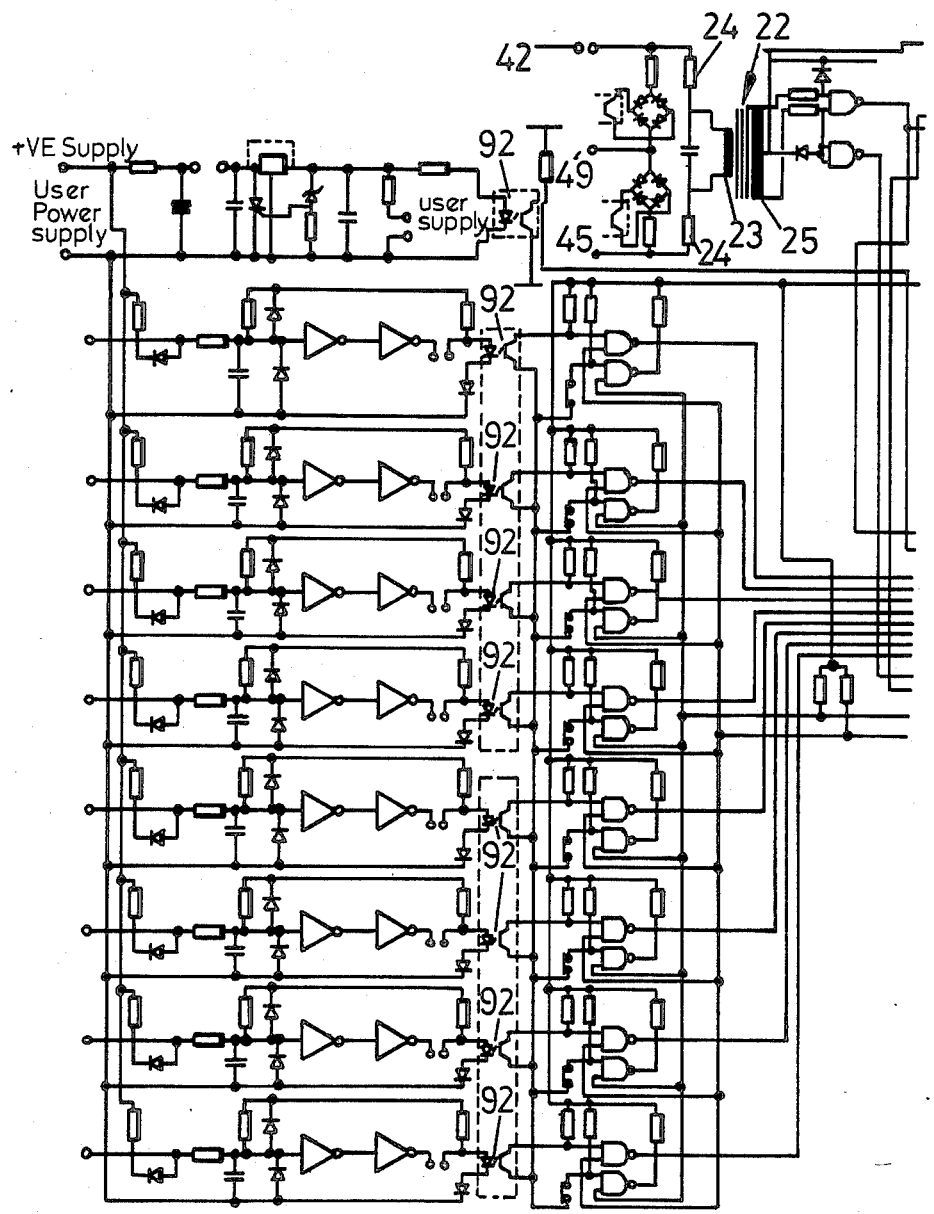
Figure 11B:
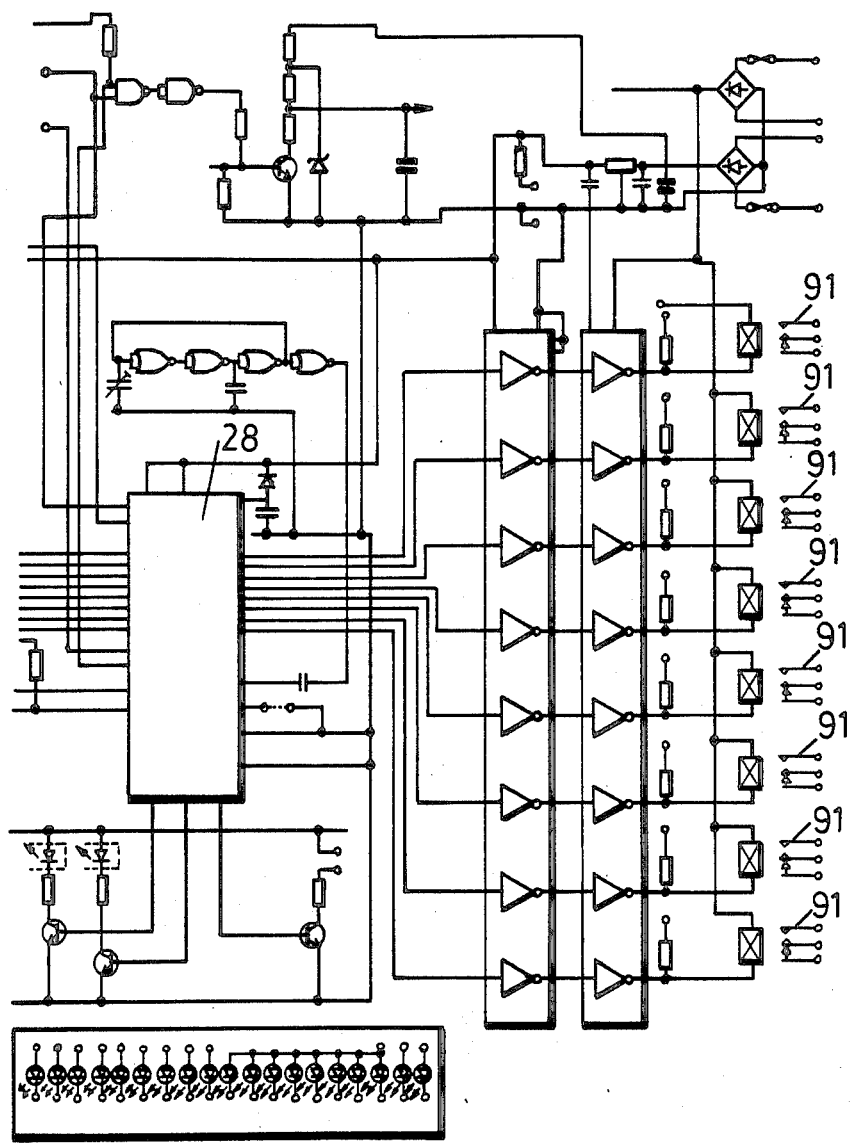

FIGS. 9(a) and 9(b) together comprise FIG. 9 which shows a detailed circuit diagram of the data encoder, data transmission line driver and data decoder in the central station of a control system embodying the present invention;

FIGS. 10(a) and 10(b) together comprise FIG. 10 which shows a detailed circuit diagram of a remote station for a control system embodying the present invention; and, FIGS. 11(a) and 11(b) together comprise FIG. 11 which shows a detailed circuit diagram of an alternative remote station for a control system embodying the present invention.

Figure 1:
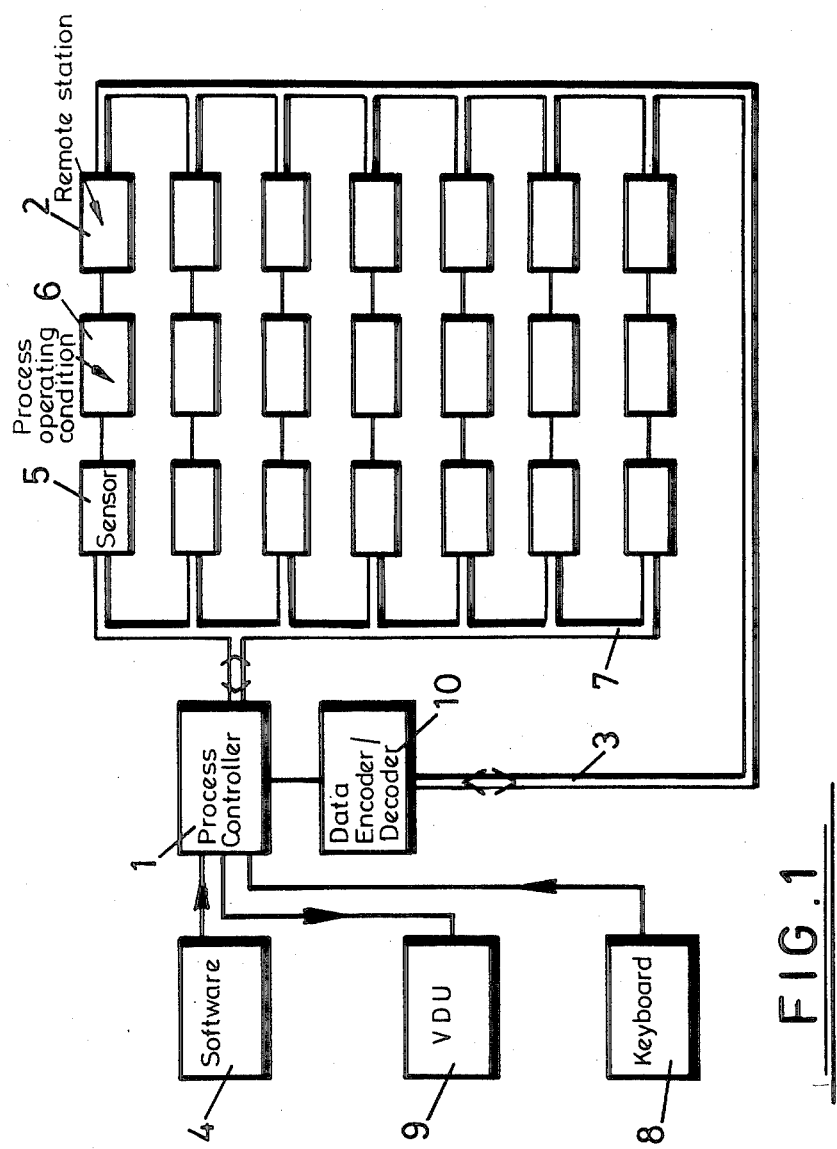
FIG. 1 shows a block diagram of a control system embodying the present invention.

Referring to FIG. 1 of the accompanying drawings there is shown a control system for a process installation, comprising a central process controller 1 connected to a plurality of remote stations 2 via a data transmission line 3. The process controller 1 consists of a microprocessor and produces binary bit data signals for transmission to the remote stations over the data transmission line 3. The data signals are produced within the microprocessor in accordance with an operating program held in software 4. To ensure that the data signals are transmitted to the remote station 2 for which they are intended each remote station 2 is assigned a unique digital address and data signals are prefixed with this address within the micro-processor, in accordance with the operating software.

Each remote station 2 comprises actuator means (not shown) which vary an operating condition 6 of the process installation. The operating conditions may include pressure, temperature flow rate, etc. Sensors 5 sense these operating conditions 6 and provide feedback to the process controller 1 via a further data transmission line 7 which can be acted upon in accordance with the operating software 4. A keyboard 8 allows data to be input to the software program manually and enables the operating conditions to be preset or varied by the control system user. A visual display unit 9 allows the operation of the process installation under the control of the control system to be visually monitored.

The process controller 1 is connected to the data transmission line 3 by means of a data encoder/decoder 10. The data encoder/decoder 10 encodes data signals from the process controller 1 for transmission to the remote stations 2 and also decodes data signals transmitted to the process controller 1 from the remote stations 2. The data returned by a remote station 2 indicates its current position, status, operating condition, etc. As such it enables the process controller 1 to continually monitor the condition of each remote station 2 and to take account of faults and failures in controlling the operating conditions of the process installation.

To enable a remote station 2 to return data signals to the process controller 1 the remote station 2 is provided with data processing means, comprising a micro-processor (not shown) capable of wiring data signals to a data write output, and means for encoding and transmitting the data signals on the data transmission line 3. Data signals may be transmitted over the data transmission line 3 on a time shared basis. To this end whenever a particular remote station 2 is required to transmit data to the process controller 1 an interrogation signal is sent to it by the process controller 1. The interrogation signal ensures that only one remote station 2 transmits data at a time and that the process controller is ready to receive it. However, in accordance with one aspect of the present invention the transmission line 3 may be used simultaneously by both the process controller 1 and a remote station 2, as will be described in detail hereinbelow.

For the purposes of the present invention the sensors 5 may be regarded as remote stations 2. To this end each sensor 5 may be provided with an onboard microprocessor which allocates a unique address to the sensor 5, which enables it to be selectively interrogated by the micro-processor of the process controller 1. The data processing capacity of the remote station micro-processor may be used to calibrate the sensor 5 from the central processor 1 and may also be used to write data signals relating to the value of the condition which the sensor 5 is sensing and the condition of the sensor 5 to the central processor micro-processor. Where data signals are generated by the sensors 5 for transmission to the central processor 1 the data transmission line 3 may sometimes be used to carry the data signals, thus enabling the data transmission line 6 to be dispensed with altogether. However, care must be exercised in this as faster data transmission rates are sometimes required for data signals from the sensors 5, compared to the data transmission rate required between the process controller 1 and the remote stations 2, necessitating the provision of a separate data transmission line 6.

The data signals generated by the process controller 1, the remote stations 2 and by the sensors 5, which can be regarded as remote stations, are comprised of binary bit data streams. The logic bit "1" is usually represented by a positive pulse and the logic bit "0" is represented by a space. Data in this form occupies a wide bandwidth and is susceptable to corruption through electrical noise and interference induced onto the data transmission line 3. As such the binary bit data streams must be encoded prior to transmission on the data transmission line 3.

Figure 2:
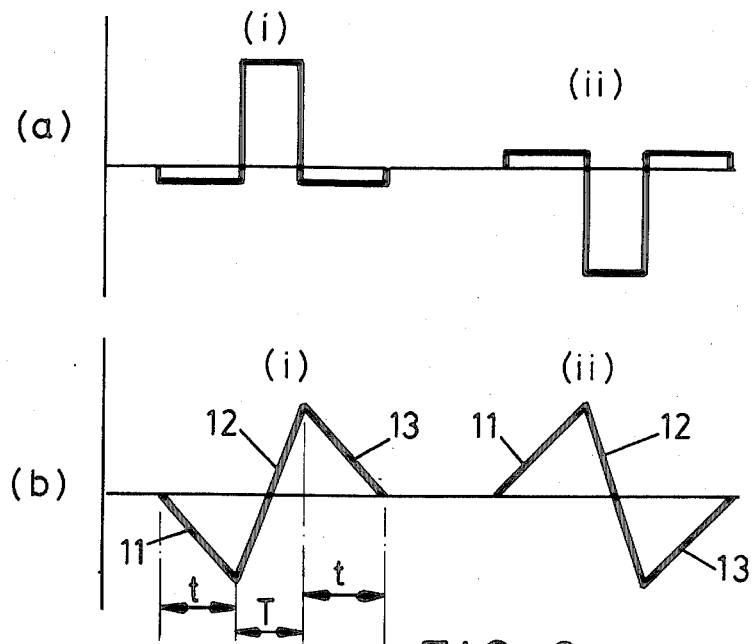
FIG. 2 shows the waveforms which are used to encode binary logic bits "1" and "0" in a control system embodying the present invention.

Referring now to FIG. 2 of the accompanying drawings there is shown a logic "1" bit (waveform 2(b) (i)) and a logic "0" bit (waveform 2(b) (ii)) encoded in accordance with the present invention. Waveform 2(b) (i) is the integral of a positive pulse having a negative D.C. offset (waveform 2(a) (i) and waveform 2(b) (i) and waveform 2(b) (ii) is the integral of a negative pulse having a positive D.C. offset (waveform 2(a) (ii)). The triangular waveforms 2(b) (i) and 2(b) (ii) are both identical to each other, but are of opposite polarity. Being triangular the waveforms 2(b) (i) and 2(b) (ii) have a very low harmonic content and no D.C. component. The bandwidth occupied by each waveform 2(b) (i) and 2(b) (ii) is determined by the gradient of the three slopes 11, 12 and 13, and particularly slope 12, the gradient of which determines the level of the higher harmonics. The harmonic content can be reduced whilst maintaining a given gradient for slope 13 by rounding of the peaks of the waveforms. It has been found in tests that if the sloping time ratio (2t/T) is given a value of 6 and the cycle length is set to 1 mS, the harmonic content is limited to 10 KHs and the waveform can be passed through circuits with a bandwidth of between 1 KHz to 10 KHz. This level of harmonic content compares very favourably with conventional encoding systems where the harmonic content may be up to 1 MHz, and the low bandwidth means that relatively cheap audio circuits can be used throughout both the encoding and the decoding circuits. Although not shown in FIG. 2 the waveforms 2(b) (i) and 2(b) (ii) are preceded by a short period of zero volts. This period of zero volts represents a wait period and ensures that there are no sudden steps between the waveforms as they are passed to the data transmission line, said step changes would result in high amplitude pulses at the decoder which could give rise to data corruption.

Figure 3:
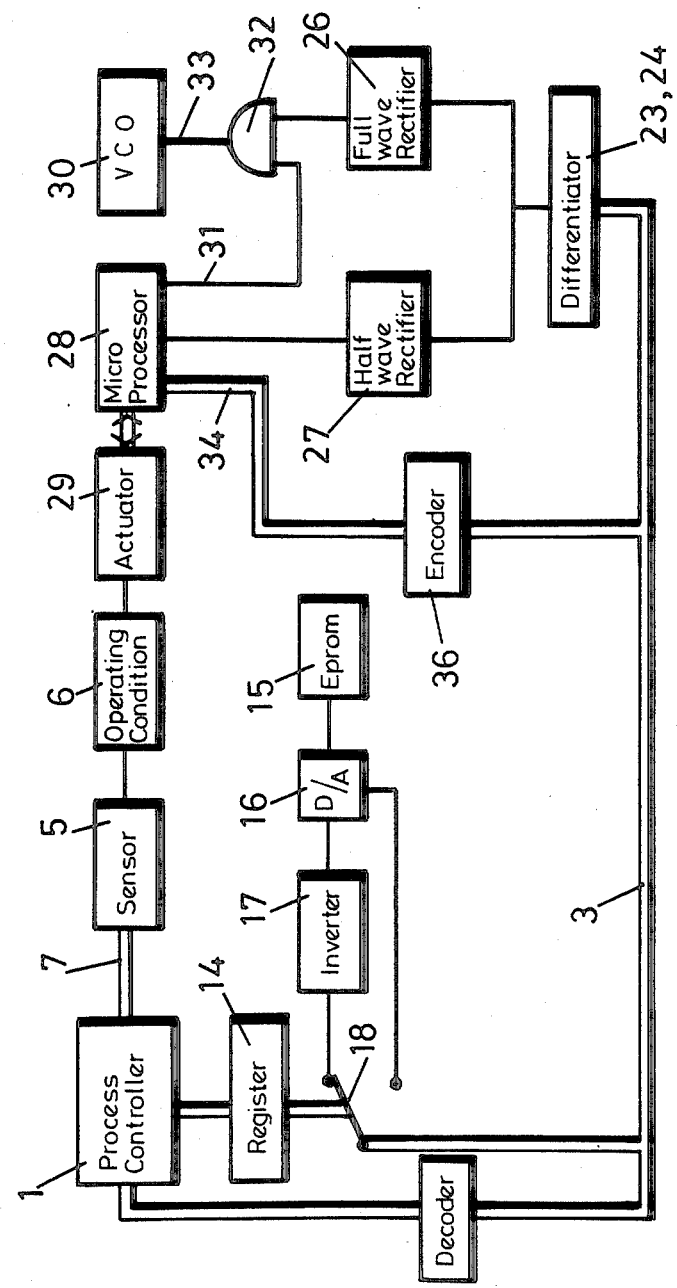
FIG. 3 is a detailed block diagram of the control system of FIG. 1, in which only one of the remote stations is shown.

Referring now to FIG. 3 there is shown a detailed diagram of the data encoder/decoder and a remote station in the control system of FIG. 1.

As indicated previously hereinabove the process controller 1 comprises a micro-processor (not shown) which produces binary bit data streams, prefixed with the unique address of the remote station 2 for which the data stream is intended. From the process controller 1 the data stream is input to the data encoder/decoder 10 where it is encoded for transmission on data transmission line 3. The data encoder/decoder 10 comprises an internal register 14 in which the data stream is stored until such time as it can be encoded and passed onto the data transmission line 3.

Each logic bit "1" and each logic bit "0" in the data stream is encoded by representing it with a respective one of the two waveforms 2(b) (i) and 2(b) (ii). One of these two waveforms 2(b) (i) and 2(b) (ii) is stored in digital form in an EPROM 15. The waveform is reconstructed by outputing the instantaneous digital values held in the EPROM 15 to a digital to triangle convertor 16. The output of the EPROM 15 provides one of the two waveforms 2(b) (i) and 2(b) (ii), whilst the other is simply obtained by inverting the output of the digital to triangle convertor 16 in an inverter 17.

The data stream output from the internal register 14 is encoded onto the data transmission line 3 by means of an electronic switch 18. The electronic switch 18 reads each bit of the data stream and switches the output of the digital to triangle convertor 16 onto the data transmission line 3 every time a particular one of the two logic states is read, and switches the output of the inverter 17 onto the data transmission line every time the other one of the two logic levels is read from the data stream. Waveform 5(a) illustrates a binary bit data stream consisting of logic level bits "1101011101", and waveform 5(c) shows this waveform after it has been encoded. Waveform 5(b) shows the offset pulse sequence from which the encoded data stream of waveform 5(c) can be considered to have been derived. Of course the offset pulse train need not actually be generated to derive the encoded data stream as this is generated by the EPROM 15, digital to triangle convertor 16, inverter 17 and electronic switch 18.

Figure 4:
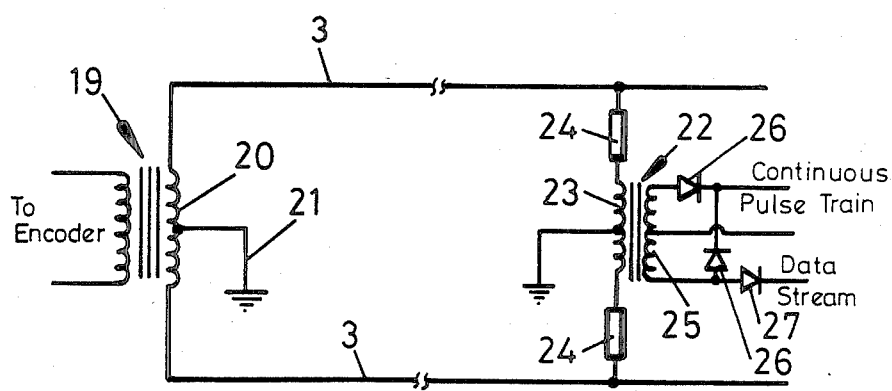
FIG. 4 shows a schematic circuit diagram of a two wire data transmission line and the decoder of a remote station in a control system embodying the present invention.

Referring now to FIGS. 3 and 4 together, the output of the electronic switch 18 is connected to the primary winding of a voltage transformer 19. The secondary winding 20 of the transformer 19 comprises an earthed centre tap 21 and is connected across a two wire data transmission line 3. As such the transformer 19 couples the output of the electronic switch 18 to the two wire data transmission line 3 and drives data on it in push-pull mode—that is the signals on the two wires of the data transmission line are identical to each other, but of opposite polarity. This ensures that there is a high degree of common mode rejection for noise and interference signals induced onto the transmission line 3. The ability of the control system to reject noise is further improved by amplifying the encoded signal prior to tranmision. Typically, the voltage on each wire of the data transmission line 3 is several tens of volts peak to peak.

The two wire data transmission line 3 is coupled to the remote station 2 by a current transformer 22. The transformer 22 serves to isolate the remote station 2 from the relatively high power levels on the data transmission line 3 and means that the control system is intrinsically safe. Each side of the primary winding 23 is connected to a respective one of the wires 3 via a resistor 24. The inductive element of the primary winding 23 and the resistors 24 form a differentiating circuit at the end of the data transmission line 3 which differentiates the waveform on the transmission line to provide a bi-directional pulse train, shown in waveform 5(b), across the secondary winding 25. Thus the transformer 22 not only couples the data transmission line 3 to the remote station 2, but contributes to decoding the encoded data stream.

The bi-directional pulse train, shown in waveform 5(b), output from the secondary winding 25 is input to a full wave rectifier 26 to provide a uni-directional pulse train, waveform 5(e), and to half wave rectifier 27 to provide a uni-directional data bit stream, waveform 5(f) corresponding to the data bit stream generated at the process controller 1. The data bit stream output from the half wave rectifier 27 is input to a micro-processor 28 within the remote station 2. The micro-processor 28 process the data stream in accordance with its operating software and amongst other things produces an analogue control signal which is applied to an actuator 29 to control an operating condition 6 of the process installation. As described previously a sensor 5 senses the current value of the operating condition 6 and returns feedback signals to the process controller 1 via data transmission line 7 which enable the operating software of the microprocessor of the central processor 1 to monitor the process installation 1.

In order that the central processor 1 can communicate with the micro-processor 28 of the remote station 2 it is necessary to ensure that the data read rate of the micro-processor 28 is synchronised to the data bit transmission rate of the data stream.

To this end the continuous pulse train output from the full wave rectifier 26 is used as a clock signal to synchronise the data read rate of the micro-processor 28 to the data bit transmission rate. A voltage controlled oscillator 30 provides a clock signal for the micro-processor 28. This clock signal is divided down by an internal timer/counter within the micro-processor 28 and generates internal interrupts for the software within the micro-processor 28. The interrupt routine is configured to switch a pin 31 of the micro-processor 28 alternately high and low which generates an output square wave on this pin 31. The period of this square wave is determined by the clock frequency of the voltage dependent oscillator 30 divided by the number of clock cycles entered into the micro-processor 28 and counted by the internal timer.

The square wave output from the micro-processor 28 and the continuous pulse train output from the full wave rectifier 26 are input to respective inputs of a comparator 32 which generates a voltage proportional to the phase difference between the two. This error voltage is returned to the control input 33 of the voltage controlled oscillator 30 to vary the output clock signal until it is synchronised with the continuous pulse train. Thus the control system provides a phase lock loop which lock the software generated square wave to the clock signal input to the micro-processor 28 from the voltage controlled oscillator 30.

The advantage of this technique is that all microprocessors using the data transmission line 3, whether in the process controller 1 or a remote station 2 will be synchronised to the data bit transmission rate. Since the micro-processors clock is part of the phase lock loop, all micro-processors on the data bus will have synchronous clock oscillators, and all the interupt software routines in all the micro-processors will be operating in synchronisation. Thus the reading of data streams and the generation of data streams is easily implemented by including the appropriate programme code at a suitable point in the interupt routine.

Using this system, drift in the timing of the data on the bus is not critical since the phase clock oscillator will change to accommodate the new timing. Since this in turn changes the micro-processor instruction execution time, the software controlled data read and transmit times are automatically adjusted to the new data timing. Moreover, very little of the processing time of the micro-processor 28 is required for signal detection which leaves more time available for data processing and programme execution. Since the phase locking is achieved by internal interrupts, no external interupts need to be used for signal detection, thus improving the remote stations immunity to noise and the electrical interference on the data transmission line 3.

Reading of data from the data transmission line 3 becomes a simple sampling exercise at an appropriate point in the interupt software routine and results in data detection system exhibiting all the noise advantages of synchronous detection and time windowing.

The micro-processor 28 is also able to write data signals for transmission from the remote station 2 to the process controller 1. The data is generated as a data bit stream at a write output pin 34 of the micro-processor 28. The data stream output from the micro-processor 28 comprises a conventional binary bit data stream, consisting of pulses and spaces, and as such must be encoded for transmission on the data transmission line 3, otherwise it is liable to be corrupted by electrical noise and interference present on the data transmission line 3. To this end a data encoder 35 is provided at the remote station 2, and a data decoder 36 is provided at the process controller 1. The encoder 35 and the decoder 36 may be identical to the encoder the decoder discussed hereinabove. However, this would necessitate using the data transmission line 3 on a time shared basis which would considerably reduce the speed on the control system or the provision of an additional pair of wires. The control system of the present invention also provides a two way data transmission system which permits data to be simultaneously transmitted by the process controller 1 and one of the remote stations 2. This two way data transmission system will be discussed in greater detail hereinbelow with reference to FIG. 8.

Figure 6:
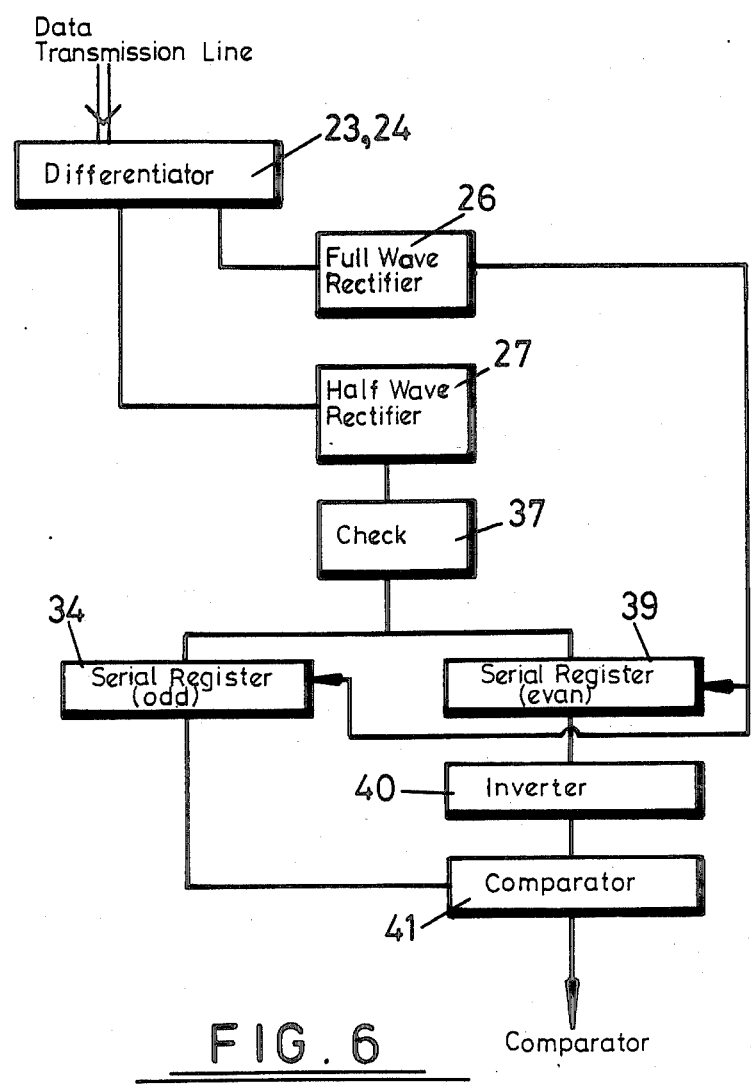
FIG. 6 shows a detailed block diagram of a circuit providing a data integrity check in a control system according to the present invention.
Figure 7:
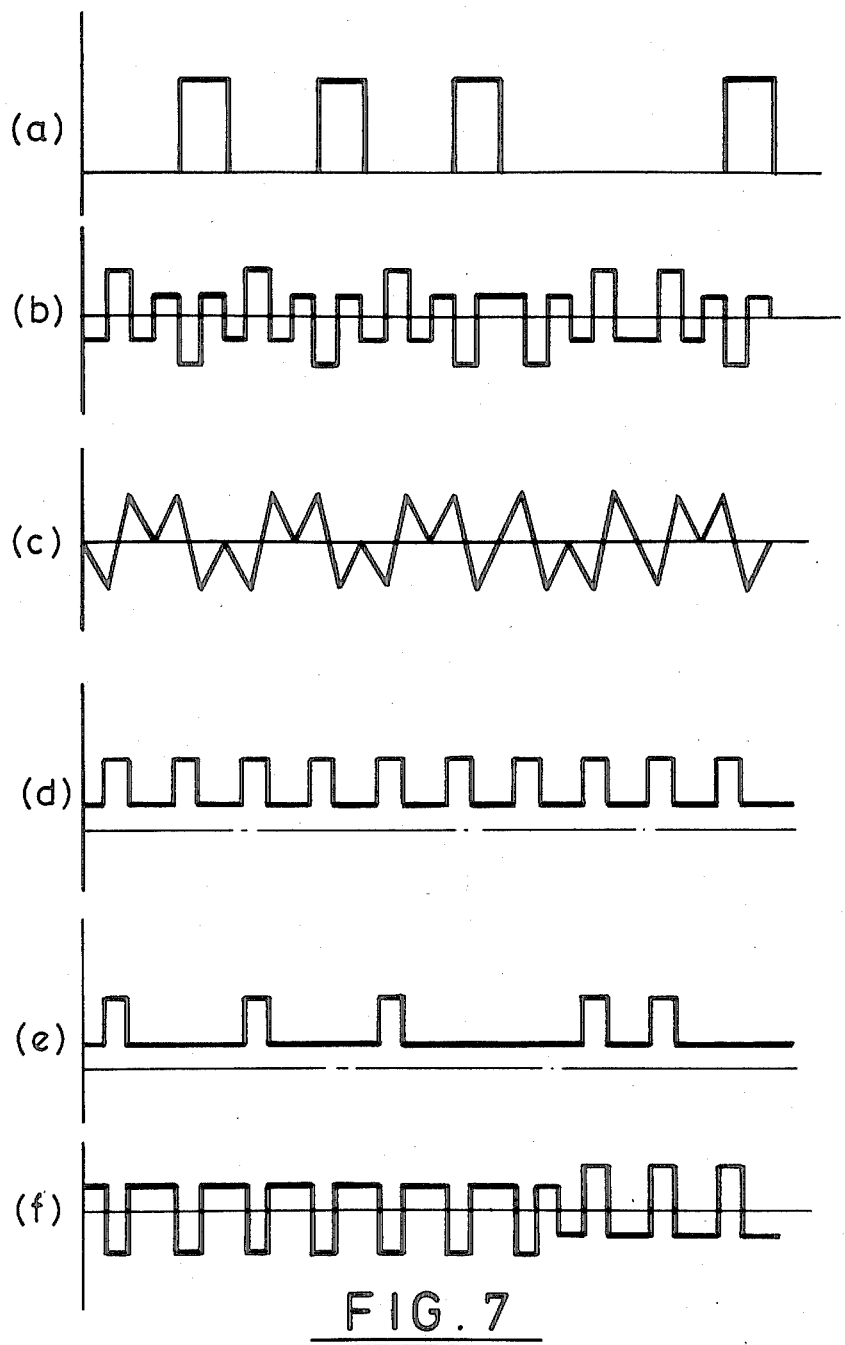
FIG. 7 shows in schematic form the sequence of waveforms of a binary bit data stream as it is encoded and decoded in a control system embodying the present invention including the data integrity check circuit of FIG. 6.

Referring now to FIGS. 6 and 7 of the accompanying drawings there is shown a block diagram of a system for verifying the integrity of data on the data transmission line 3 in a control system according to the present invention and an alternative to the waveforms of FIG. 2 for encoding the data stream which enables the data verifying system to be used.

Waveform 7(a) shows a binary bit data stream prior to encoding. The data stream encoded by representing each logic bit with a respective unique combination of the two waveforms shown in FIG. 2. Each logic bit "1" is represented by waveform 2(b) (i) followed by waveform 2(b) (ii), and each logic bit "0" is represented by waveform 2(b) (ii) followed by waveform 2(b) (i) and for the data stream of waveform 7(a) the encoded waveform is shown by waveform 7(c).

The waveform is transmitted on the data transmission line 3 and is differentiated to derive the bi-directional pulse train of waveform 7(b) as previously described hereinabove with reference to FIGS. 3 and 4. The bi-directional pulse train output from the differentiator 23,24 is applied to full wave recifier 26 to provide a continuous uni-directional pulse train, shown by waveform 7(d) and to a half wave rectifier 27 to produce a uni-directional pulse train shown by waveform 7(e). It will be noted that the frequency of the continuous pulse train, shown by waveform 7(d) is twice that of the encoded data stream. The uni-directional pulse train of waveform 7(e) corresponds to the encoded data stream, except that each logic bit "1" in the data stream is represented by every pulse corresponding in position to the oddly occurring pulses in the pulse train of waveform 7(d) and every logic bit "0" is represented by every pulse corresponding in position to the evenly occurring pulses in the pulse train of waveform 7(d).

The pulse train output from the half wave rectifier 27 is input to a check 37 which monitors the data stream for a start bit indicating the start of a new data stream, as shown in waveform 7(f). Once a start bit is detected by the check 37 the data stream is read into a pair of 8 bit serial registers 38 and 39. The registers 38 and 39 are synchronised to the data stream by the continuous pulse train output from the full wave rectifier 26. Register 38 is synchronised to read the data stream with every oddly occurring pulse in the continuous pulse train and register 39 is synchronised to read the data stream with every evenly occurring pulse in the continuous pulse train. The binary bit word read into register 38 will correspond exactly to the encoded data stream and will read "11101". On the other hand the binary bit word read into register 39 will be the exact complimentary of this and will read "00010". The binary bit word read into register 39 is input to an inverter 40 and output of the inverter 40 is then compared in a comparator 41 with the binary bit word read into register 38. If the compared binary bit words are identical then the encoded data stream has been transmitted without being corrupted. If, however, the binary bit words differ then the integrity of the transmitted data stream has been comprimised.

The data integrity check can be effected in the manner outlined above because the bi-directional pulse train produced at the output of the differentiating means 23,24 comprises a positive going pulse corresponding to each bit in the data steam. If no pulse is present to indicate either a logic bit "1" or a logic bit "0" then there must have been data corruption and this can be detected in the manner outlined above.

A second, simpler data integrity check can be effected by outputing the outputs of the half wave rectifier and of the full wave recitifer to counters which count the number of pulses over a predetermined period of time. The number of pulses output from the full wave rectifier should be exactly twice the number of pulses output from the half wave rectifer. This can be checked by dividing the number of pulses from the full wave recitifier by two and checking the two counts in a comparator.

If the data integrity checks carried out by either of the above described systems fail then the micro-processor 28 at the remote station 2 sends a signal to the process controller 1 requesting that the data be sent again.

It is desirable that each new data stream to a remote station 2 be preceded by a data read instruction to enable the micro-processor at a remote station to identify when a data stream massage commences. This can be achieved by momentarily suppressing two pulses on the data transmission line to indicate the start of a message. Suppressing the data stream for this short period of time does interupt the continuous pulse train which is output from the full wave rectifier, but this does not adversely affect the phase lock loop which relies on the continuous pulse train to synchronise the micro-processor read rate to the data bit transmission rate.

As an alternative three consecutive pulses of the same polarity may be used to indicate the start of a new data stream. The use of three consecutive pulses of the same polarity to indicate the start of a new data stream is particularly suited to the double waveform encoding described with reference to FIG. 7, as three consecutive pulses of the same polarity will never fall together in a decoded data stream encoded according to this method. Waveform 7(f) represents the output of the differentiating means 23,24 prior to a data stream message being sent, and comprises a continuous pulse train of negative pulses followed by a start message consisting of three positive going pulses. The pulses are meaningless in terms of data transmission, but do ensure that a continuous stream of pulses is available at the remote station 2 to phase lock the micro-processor 28 to the data rate of the control system as a whole. The pulses are software pulses are generated at the process controller 1.

Figure 8:
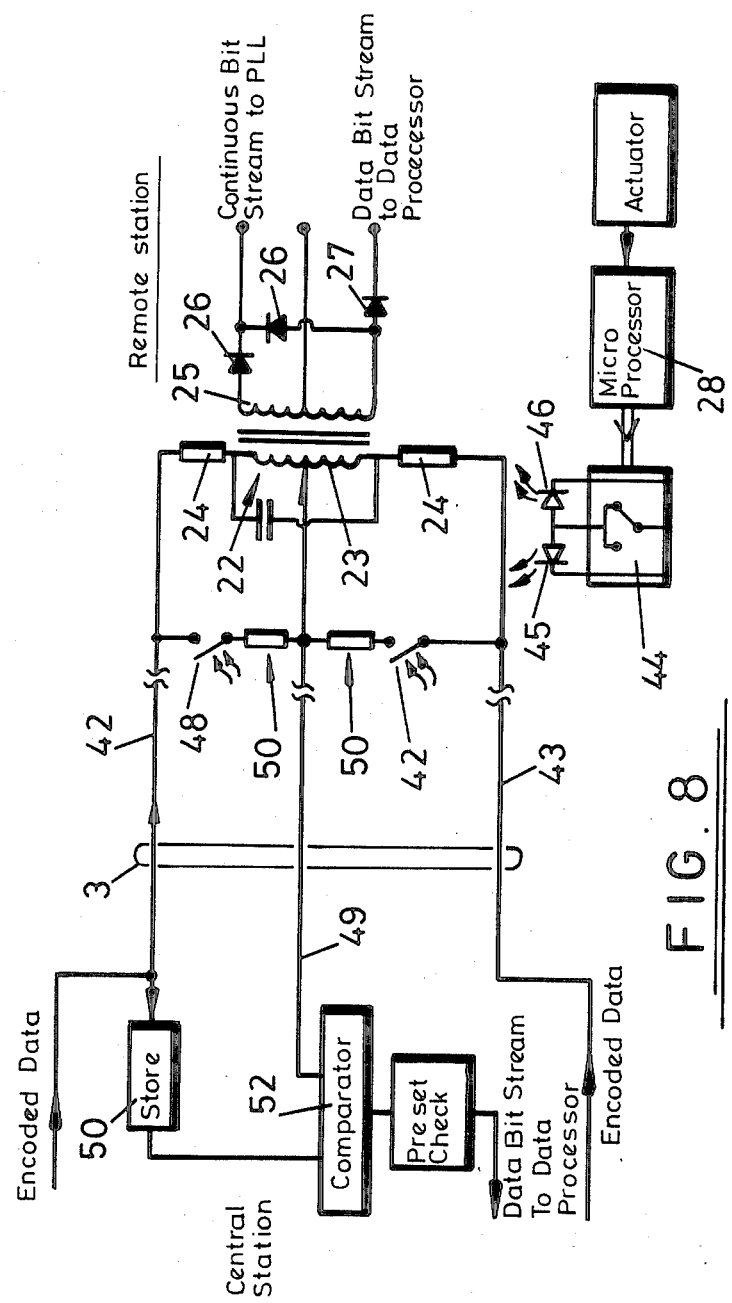
FIG. 8 shows a schematic circuit diagram of a two way communication, three wire data transmission line for use in a control system embodying the present invention.

Referring now to FIG. 8 there is shown a schematic diagram of a system which permits two way communication between a remote station 2 and a central station (not shown).

Data communication from the central station to the remote station 2 is via the three wire data transmission line 3, two of the wires 42 and 43 being employed to carry the data from the central station to the remote station 2 in push-pull mode—that is the signals on each of the two wires 42 and 43 are identical, but opposite to each other in polarity. Data encoding and decoding of the data stream transmitted between the central station and the remote station 2 is as previously described hereinabove.

In order to encode a data stream generated at the remote station 2 the data write output 34 of the remote station micro-processor 28 is connected to an electronic switch 44. The electronic switch 44 is connected to a pair of light emitting diodes 45 and 46 and is so arranged as to switch one or the other of the LEDs 45 and 46 on depending on its position. The data write output 34 drives the electronic switch 44 so that for each logic bit "1" in the data stream LED 45 is turned on and for each logic bit "0" in the data stream the other LED 46 is turned on.

Each one of the LEDs 45 and 46 is optically coupled to a respective normally open light sensitive switch 47 and 48, and each one of the light sensitive switches 47 and 48 is connected between a respective one of the two wires 42 and 43 carrying encoded data from the central station to the remote station 2 and the third wire 49. For each logic bit "1" read from the data write output 34 LED 45 is turned on, causing light sensitive switch 47 to close. This results in the encoded data signal on wire 42 being reflected back to the central station over the third wire 49. For each logic bit "0" read from the data write output 34 LED 46 is turned on, causing light sensitive switch 48 to close and the encoded data signal on wire 43 to be reflected back to the central station over the third wire 49. A resistor 50 is connected in series with each of the light sensitive switches 47 and 48 to convert the voltage signals on wires 42 and 43 to a current level on the third wire 39 and to ensure that the switch 47,48 does not short circuit the data transmission line 3 when it is closed.

At the central station one of the two wires 42 carrying encoded data from the central station to the remote station 2 is connected to a serial register 51 which is continuously updated to hold the current value of the signal on the wire 42. Of course the signal held within the serial register 51 will be identical to the signal on the other one of the two wires 43, but of opposite polarity to it, as data is driven on the two wires 42,43 in push-pull mode. This stored value is compared with the signal reflected back to the central station on the third wire 49 via one or other of the two switches 47,48 in a comparator 52. Depending upon whether or not the stored signal and the reflected signal are identical to, or differ from each other, it is possible to determine which of the two light sensitive switches 47,48 has been closed and from this whether a logic bit "1" or a logic bit "0" has been read from the data write output 34 of the microprocessor 28 within the remote station 2. The data stream is reconstructed in a preset check device 53 which is preset to output binary logic bits in accordance with the convention that identical signals indicate a logic bit "1" and differing signals indicate a logic bit "0".

Referring now to FIG. 9 of the accompanying drawings there is shown detailed circuit diagram of the data encoder/decoder of a central station in a control system embodying the present invention.

The circuit of FIG. 9 comprises a data encoder to the left of the Figure, a push-pull amplifier arrangement provided in the upper right hand corner of the Figure and a decoder for encoded data transmitted from a remote station (not shown) in the bottom right hand corner of the Figure. Each of these three circuits will now be discussed.

The data encoder is responsible for generating the triangular waveform which is used to represent each data bit in the encoded data stream signal transmitted on the data transmission line 3. In this circuit arrangement the triangle waveform is generated by a triangle wave generator, the heart of which is comprised of an integrator circuit, comprised of operational amplifier 53 and capacitor 54, and a Schmitt trigger, comprised of operational amplifier 55 and driver transistor 56.

The output of the Schmitt trigger 55,56 switches between +/− a predetermined voltage out as the voltage level at the input varies between predetermined threshold levels. The voltage output from the Schmitt trigger is input to the integrator via one of a pair of voltage dropping resistors 58,59, determined by the polarity of the voltage out, and a field effect transistor switch 60. The integrator 53,54 integrates the voltage applied to its input and produces a ramp voltage at its output. This ramp voltage is applied via a voltage dropping network comprised of resistors 61 and 62 to the input of the Schmitt trigger 55,56. Once the ramp voltage has risen to a predetermined voltage level it triggers the Schmitt trigger 55,56 and causes the output of the Schmitt trigger 55,56 to switch. The voltage output from the Schmitt trigger 55,56 changes polarity and as a consequence the incline of the ramp waveform output from the integrator 53, 54 reverses. In this way a triangular waveform is generated at the output of the integrator 53,54.

The slopes of the positive and negative going ramps comprising the triangular waveform are determined by the level of the input to the integrator 53,54. Since this is determined by the values selected for the resistors 58 and 59 the incline of the positive ramp can be selected to differ from that of the negative ramp. Moreover, the provision of a variable resistor 63 between the output of the Schmitt trigger 55,56 and the integrator 53,54 allows the incline to be varied, thus allowing the period of the triangular waveform to be adjusted.

The output of the integrator circuit is applied to a unity gain amplifier comprising operational amplifier 64. Connected between the non-inverting and the inverting inputs of the op-amp 64 is a field effect transistor switch 65 which allows the op-amp 64 to be switched between acting as a non-inverting unity gain amplifier and an inverting unity gain amplifier. By varying the control signal on the gate of the switching FET 65 it is possible to produce both waveforms 2(b) (i) and 2(b) (ii) at the output of the op-amp 64. The gate of the FET switch 65 is connected to the data write output of central station micro-processor (not shown) and as a consequence the waveform output from the op-amp 64 comprises the encoded data signal of either waveform 5(c) or 7(c).

The triangle generator is synchronised to the data bit rate of the micro-processor (not shown) of the central station by means of the FET switch 57 connected in the input to the integrator 53,54. This FET switch is driven by the clock signal of the micro-processor and is accordingly turned on at the beginning of each pulse in the clock stream. This ensures that the triangular waveform is synchronised to the data bits output from the data write output of the central station micro-processor.

Figure 5:
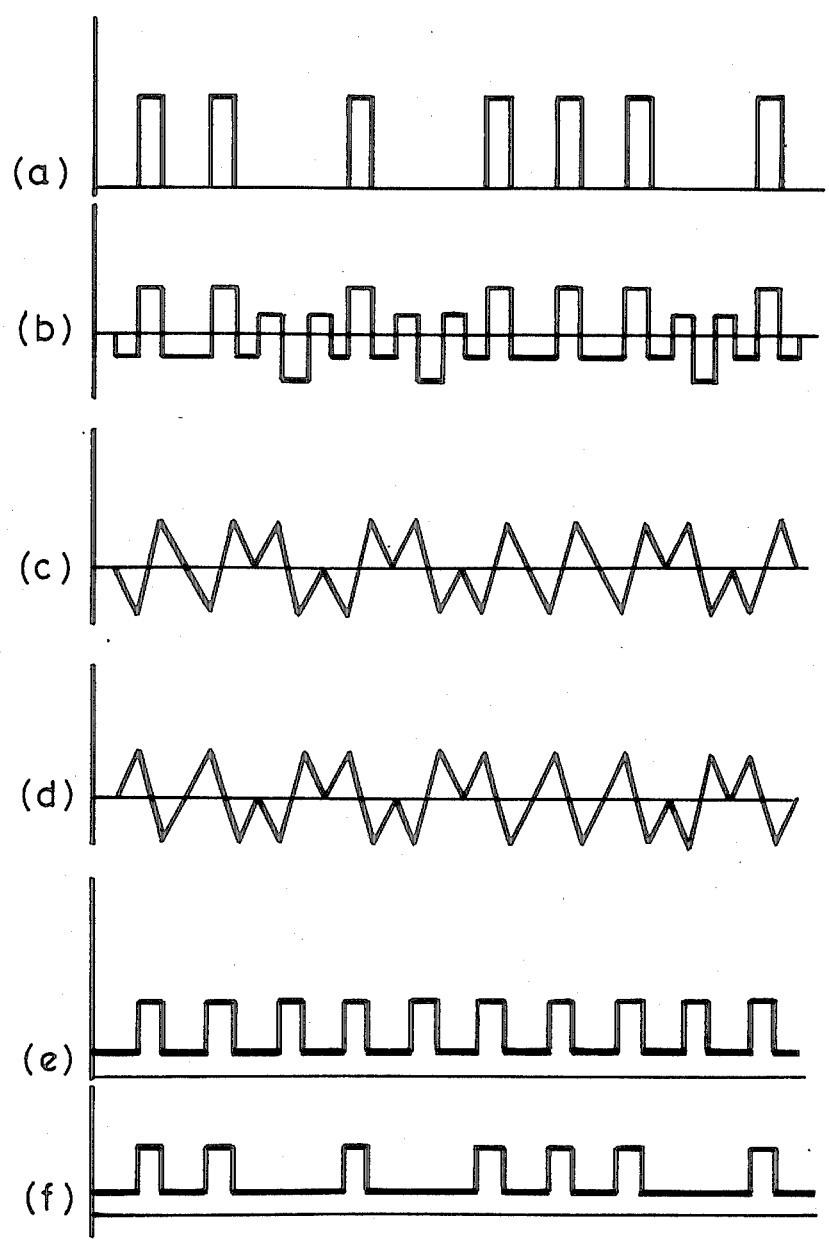
FIG. 5 shows in schematic form the sequence of waveforms of a binary bit data stream as it is encoded and decoded in a control system embodying the present invention.

Although not illustrated in the waveforms of FIGS. 2, 5 or 7 it has been found desirable to precede each triangle waveform with a wait period which allows the encoding system to output each waveform cycle to the data transmission line during a safe period. Without this wait period rapid voltage changes can be introduced into the encoded waveform signal which can compromise data integrity. In the circuit of FIG. 9 this wait period is introduced to the beginning of each waveform cycle by a latch arrangement consisting of operational amplifier 66. The op-amp 66 delays the opening of the FET switch at the beginning of each clock cycle, thus providing a period of no signal at the beginning of each triangle waveform output from the integrator 53, 54.

The output of the non-inverting/inverting unity gain op-amp 64 is input via a variable resistor 67, controlling the amplitude of the encoded waveform signal to a push-pull amplifier arrangement which drives the encoded waveform signal onto both wires 42,43 of the data transmission line 3. The operation of the push-pull amplifier is conventional and does not require detailed explanation here.

In the decoder for data transmissions from a remote station 2 the third wire 49 of the data transmission line 3 on which the data is carried is coupled to the decoder by means of a transformer 68 having a centre tapped secondary winding 69. The transformer acts as a differentiating circuit and produces at its output a bi-directional pulse train. The bi-directional pulse train output from each arm of the secondary winding 69 is half wave rectified by a diode 70 to derive a uni-directional pulse train. The uni-directional pulse train output from one of the diodes 70 will correspond to the data stream input to the encoder via the FET switch 65, whilst that output from the other diode 70 will correspond to the complimentary of this data stream. From the diodes 70 the uni-directional waveforms are each input to a respective transistor amplifier 71. The output of each transistor amplifier 71 is input to a respective two input NOR gate 72 and 73, one of which 72 is also connected directly to the data stream driving the FET switch 65 and the other of which is connected to an inverted copy of the data stream driving the FET switch 65. The outputs of the NOR gates 72 and 73 are in turn connected to an OR gate 74.

It will be appreciated that the signal returned on the third wire 49 indicates the closer of one or other of the two switches in the remote station, indicating a logic "1" or a logic "0". In the circuit of FIG. 9 the convention is so arranged that if the signals output from the secondary winding 69 are identical to the inverted and non-inverted versions of the signal to the two NOR gate 72 and 73 then the output of both gates 72 and 73 is a "1", which in the OR gate 74 results in a logic "1" being output. If the other switch is closed then the signals output from the secondary winding 69 will be opposite of the inverted and non-inverted versions of the signal at the two NOR gates 72 and 73 and the output of both gates will be a "0", which in the OR gate 74 results in a logic "0" being output. Thus, the data stream written at the micro-processor of the remote station 2 is reconstructed at the central station.

Referring now to FIG. 10 of the accompanying drawings there is shown a detailed circuit diagram of a remote station 2 of a control system embodying the present invention. Data is input to the remote station 2 on data transmission lines 42 and 43 and is differentiated by the primary winding 25 of transformer 22. The output of the secondary winding 25 is half wave rectified to derive a uni-directional pulse train corresponding to the data stream which is input to the micro-processor 28 of the remote station to be processed. The output of the secondary winding is also full wave rectified to provide a continuous pulse train which is used to phase lock the data read rate to the data bit transmission rate.

Data is written from the data write output 34 of the microprocessor 28 and is used to drive light emitting diodes 45 and 46 to encode the data for transmission in the manner described hereinabove.

An eight bit DIL switch 75 is provided to enable a user to determine the address of the remote station 2 and a user programmable link 76 is provided to enable the operating software of the micro-processor 28 to be programmed.

Usually data concerning a remote station will come from the central station or process controller. However, sometimes the remote station 2 may be required to stand alone. To this end on board present values must be set in respect of the operating characteristics of the actuator. These are opening speed, closing speed, dead band, zero set and span. The position signal will be driven from an external analogue voltage or current source usually comprised of a variable resistor (not shown).

To preserve existing on board characteristics the circuits which determine the zero set and span, and those which select voltage or current source for the position signal can remain unchanged. However, those involving the speed control and the dead band are specific to the control programme of the microprocessor 28.

In order to accommodate the dual purpose role of the micro-processor a programme has been developed which operates as an analogue closed loop feedback system. In most digital control loops external analogue feedback signals are digitized using an A to D (analogue to digital convertor) and presented to the micro-processor as a ditigal signal. In this way the micro-processor can perform data manipulations and calculations which will establish dead band limits, position dependent speed cotnrol, etc. To adapt such a technique in a conventional actuator would require two A to D convertors or an analogue multiplexer with a single A to D convertor. This is because the stand alone mode requires two analogue voltages to be inputed to the micro-processor. Since A to D convertor chips cost more than the micro-processor chip this is an expensive solution.

As an alternative the present invention provides for the comparison of the control voltage output from the micro-processor 28 and the feedback voltage from the actuator (not shown) in a voltage comparator chip 76. The output of the comparator 76 is sensed by an input pin 77 of the micro-processor 28. Under normal circumstances this would not be a very successful control system because the actuator would hunt violently about the control position. However, to prevent this a variable dead band control is provided which is user adjustable by means of a multiturn variable resistor 78. This introduces a square wave voltage to one side of the comparator 76 which is added to the D.C. voltage at that point. If the square wave voltage amplitude is $\Delta V$, then the output from the comparator 76 will be a square wave if $V_F \leq V_A \pm \Delta V$. If $V_F$ is outside this range then the output will be permanently HI or LO depending on the direction of the error. The dead band square wave is derived from the same pin of micro-processor 28 as the phase locking square wave, that is pin 93. This means that the programme which senses the state of the T1 input can be driven from the same interrupt cycle which then synchronously detects the output of the computer.

Using this technique the present invention provides a control system which operates at the analogue level and uses a few extra components. It also enables a switch to be made to digital control of valve position by changing one link on the circuit board. In this respect when using digital control the micro-processor 28 sets up an eight bit word at an output port. This is converted to an analogue control voltage by a D to A converter 29. These converters are much cheaper than A to D convertors.

Located within the micro-processor 28 is a subroutine for detecting the output of the comparator 76. This subroutine is called once every half cycle of the dead band square wave. It generates three codes which are temporarily stored in an internal register. The codes represent HIGH, LOW, or DEAD BAND. The second half of the subroutine operates on the internal register and compares the latest detected state of the control loop with the previous state as defined by the contents of the internal register. This comparison process is performed every half cycle. Only when the contents of the internal register have been stable for 20 consecutive half cycles (10 milliseconds) will the programme accept the code in the internal register as valid, at which time it is transferred to a second internal register 2 for use by the control programme. This technique ensures that noise produced by wiper contacts, spurious pulses on the analogue control lines and mechanical vibration of the feedback potentiometer do not cause erratic responses.

When the control loop detects the need for a position change it must be achieved by driving the actuator motor in the appropriate direction at the selected speed. Referring to FIG. 10 this is achieved using a single triac 80 and two interlocked direction determining relays 81,82. Three output pins 83,84 and 85 on the microprocessor are used to control the triac 80 and relays 81,82. These three pins 83,84 and 85 also drive the circuit which produces the preset control of speed for opening and closing the valve.

A second subroutine checks for changes in the second internal register within the micro-processor 28. If a change occurs in this internal register then the appropriate relay drive outputs are established. A 250 millisecond delay is started whenever a change occurs. In the case of a need to change from OFF to ON, this is executed immediately. A change from ON to OFF requires the delay to be completed via a different subroutine. This technique ensures that the relays 81,82 will be ON *before* the triac 80 switches ON, and that the triac 80 will switch OFF *before* the relays 81,81 open.

Once the relay state has been established then a third subroutine commences which performs the necessary delay functions and sets up the speed controlling register within the micro-processor 28 before moving to the speed control subroutine.

To conform with conventional speed control techniques, a fourth subroutine switches the triac 80 in 250 millisecond pulses. The OFF time between pulses is determined by 8 bit numbers contained in two further registers contained within the micro-processor 28. The actual OFF time is $T_F \times T_C \times 1$ millisecond, and in principle could be varied in 1 millisecond intervals. In practice the number of time steps will be limited to an approximate logarithmic scale based on percentage speed changes.

If the register contains zeros the programme defaults to the external time controls. It will be realised that the capacitor 86 charges to +5 volts during each triac ON pulse and will discharge via resistors 87 and 88 according to which relay 81,82 is energised. Thus the discharge of the capacitor 86 can be different for open or close conditions. The level of the voltage on capacitor 86 is compared in a comparator 89 a fixed d.c. voltage equal to ⅓ of the supply voltage and after a time equal to the time constant of capacitor 86 and the discharge resistor 87,88 the output of the comparator 89 changes. The micro-processor 28 senses this change and terminates the OFF period when the change occurs.

It will be appreciated that the above action only takes place if the timing register contains zero. These registers are loaded with zero when the processor is initialised, therefore the actuator uses the presets for speed control in the absence of any digital commands. When the actuator is connected to the data transmission line speed control signals transmitted along the line will be transferred to these registers and will then be used to control the speed. The speed of the actuator will then remain at this transmitted value until a zero is transmitted over the line, at which time the control will return to the preset. It is possible to transmit different time signals to the actuator so that digital control of the speed can be changed at will from the central controller. It is also possible to mix the controls so that the speed in one direction is preset whereas the other is digital controlled.

In the event that the acutators are to be sequentially controlled this can be controlled from the process controller using a simple timer. Each actuator is signalled as and when it is required to go into operation and of course data relating to its current position, that is open, closed or midway can be transmitted back down the two data bus.

Where progressive control is required, that is where accurate positioning of the actuator is required, it has been usual to provide a programmable logic controller which will perform the necessary algorithmic calculations on each actuator to arrive at the correct position to achieve a predetermined result. Determination of the correct algorithm for each actuator is a complicated business and involves a lot of time spent in setting up the system. In the control system embodying the present invention it is possible to circumvent this by making the data commands to each actuators one of three possible option; "run towards open", "run towards closed"; and "stop". The outputs from the sensors can then be used within the process controller to arrive at errors from a predetermined value in the sensed parameters only and need no longer be concerned with the actual valve position. The speed at which the actuator moves can be preset so as to match the actuator response time to that of the sensed parameters and indeed it is possible to programme the system so that the actuator runs faster for a large sensed parameter error signal and progressively slows as the error signal decreases.

This considerably simplifies the control system and means that setting up time is considerably reduced.

FIG. 11 of the accompanying drawings shows the circuit diagram of a considerably simplified remote station controlling a number of actuators 90. The actuators 90 are switchable between an on and an off state by relays 91. Data from the actuators is returned to the micro-processor 28 via optical couplings 92.

In the circuit of FIG. 11 data decoding, and signal verification, phase locking and data writing within the remote station are substantially as described previously hereinabove.

I claim:

1. A data system comprising:
   a data transmitting station;
   at least one data receiving station; and
   a data transmission line coupling said stations together;
   said transmitting station comprising processor means providing in multiple state data stream form data for transmission between the stations and encoder means connected to the processor means for encoding the data stream prior to transmission of said data on said transmission line;
   each said receiving station comprising decoder means connected to said transmission line for receiving and decoding the encoded data stream, wherein the encoder comprises signal generating means for selectively generating a first waveform substantially corresponding to the integral of a positive pulse having a negative d.c. offset and a second waveform substantially corresponding to the integral of a negative pulse having a positive d.c. offset, the time average of each pulse and its associated d.c. offset being substantially zero, reading means connected to the processor means for sequentially reading each state of the multi-state data stream, and outputting means connected to the signal generating means and controlled by the reading means for outputting onto the data transmission line a composite waveform consisting of a respective combination of the first and second waveforms for each of the states read from the data stream, and wherein each decoder comprises differentiating means for differentiating said composite waveform received from the transmission line to derive a bi-directional pulse train representing the multiple state data stream.

2. A data system according to claim 1 wherein the signal generating means comprises a memory in which the instantaneous values of at least one of the said first and second waveforms are stored.

3. A data system according to claim 2 wherein only one of said first and second waveforms is stored in said memory, and inverter means coupled to the output of said memory to provide the other waveform.

4. A data system according to claim 2 wherein the first and second waveforms are each stored in a respective page of memory and switching means is provided for switching between the two pages to generate one or the other of the waveforms.

5. A data system according to claim 1 wherein the signal generating means comprises a continuous pulse train generator integrating means connected to said generator for integrating the continuous pulse train output thereof to provide a triangular waveform, inverter means connected to said integrating means for inverting the triangular waveform, and switching means for switching between the output of the integrator or the output of the inverter.

6. A data system according to claim 5 wherein the signal generating means further comprises sync means for synchronizing the continuous pulse train generator with the processor means.

7. A data system according to claim 1 wherein the signal generating means further comprises means for introducing a wait state at the beginning of each first and each second waveform, which wait state comprises a period of zero volts at the beginning of each first and each second waveform.

8. A data system according to claim 1 wherein the data transmission line comprises two wires and encoded data is carried on said two wires in push-pull mode.

9. A data system according to claim 1 wherein said multiple state data stream provided by said processor means comprises a binary bit data stream, and the said outputting means comprises means for outputting a first combination of said first and second waveforms for each logic bit "1" read from the data stream, and a second combination of said first and second waveforms differing from said first combination, for each logic bit "0" read from the data stream.

10. A data system according to claim 9 wherein said first combination comprises one of said first and second waveforms and said second combination comprises the other one of said first and said second waveforms.

11. A data system according to claim 9 wherein one of the said first and second combinations is comprised of the first waveform, followed by the second waveform and the other one of said first and second combinations is comprised of the second waveform followed by the first waveform.

12. A data system according to claim 9 wherein means are provided at each data transmitting station to provide a data start signal and means are provided at each data receiving station for sensing the data start signal.

13. A data system according to claim 12 wherein the bi-directional pulse train output from the differentiating means is output to a half wave rectifier to provide a uni-directional pulse train comprising a pulse for every bit in the data stream, wherein every oddly occurring pulse corresponds to one logic level bit and every evenly occurring pulse corresponds to the other logic level bit.

14. A data system according to claim 13 wherein each receiving station comprises a first serial store which stores every oddly occurring pulse output from the half wave rectifier, a second serial store which stores every evenly occurring pulse output from the half wave rectifier, an inverter which inverts the bit word stored in one of the two serial stores to derive the compliment thereof, and a comparator which compares the output of the inverter with the bit word stored in the other serial store and confirms the verity of the received data only if the compared words are identical.

15. A data system according to claim 13 wherein each receiving station comprises a full wave rectifier connected to the output of the differentiating means, a first counter counting every pulse output from the half wave rectifier, a second counter counting every pulse output from the full wave rectifier and a comparator which compares the counts in the first and second counters and confirms the verity of the data only if the number in the first counter is half that in the second.

16. A data system according to claim 1 wherein each receiving station comprises a sync system for synchronizing the data read rate of a data receiving station to the received data stream, which sync system comprises a full wave rectifier connected to the output of the differentiating means to derive a continuous uni-directional pulse train, a voltage controlled oscillator the output of which determines the data read rate for the data receiving station, and comparator means for comparing the output of the voltage controlled oscillator with the pulse train output from the full wave rectifier to provide an error voltage proportional to the phase difference between the two signals, which error voltage is applied to the voltage controlled oscillator to synchronize the data read rate of the data receiving station to the received data stream.

17. A data system according to claim 16 wherein the data transmitting station comprises means providing a continuous pulse train during periods when there is no data stream to be transmitted to ensure that the data receiving stations are always provided with a synchronizing clock pulse train.

18. An encoder for encoding a multi-state data stream for use in the data system according to claim 1, said encoder comprising signal generating means for selectively generating a first waveform substantially corresponding to the integral of a positive pulse having a negative d.c. offset and a second wavefrom corresponding to the integral of a negative pulse having a positive d.c. offset, the time average of each pulse and its associated d.c. offset being substantially zero, means for sequentially reading each state of a multi-state data stream, and means for outputting a composite waveform consisting of a respective combination of the first and second waveforms for each of the states read from the multi-state data stream.

19. A decoder for decoding encoded multi-state data streams for use in a data system according to claim 1 comprising differentiating means for differentiating the encoded signals on a transmission line to derive a bi-directional pulse train representing the multi-state data stream.

20. A data transmission system for simultaneously transmitting data streams between a pair of stations coupled together by a three wire bus, wherein one of said stations comprises means for providing a first data stream having not more than three states, a pair of normally-open switches, said switches being connected between one wire of said three wire bus and a respective one of the remaining two wires of said bus, means for sequentially reading each state of the first data stream, and control means operable by said reading means for closing one of the two switches for each first data state read from the first data stream, the other of the two switches for each second data state read from the first data stream and for opening both of said switches for each third state read from the first data stream, the other of said stations comprising means for outputting a second data stream in push-pull mode on said remaining two wires of said bus, means connected to said one wire of said bus for monitoring the signals reflected on the said one wire by closure of said switches in said one station whereby to determine which and in what sequence said switches are closed, and means for regenerating the first data stream at said other station from the output of the monitoring means, said one station further comprising means connected to said remaining two wires of said bus for reading said second data stream.

21. A two-way data transmission system according to claim 20 wherein each of the switches comprises an optical switch and the control means comprises a pair of light emitting diodes each of which is optically connected to a respective one of the optical switches and is driven by the reading means for sequentially reading the first data stream so that for each of said first states read from the first data stream one of the light emitting diodes is turned on and for each of said second states read from the first data stream the other light emitting diode is turned on and for each of said third states read from the first data stream both light emitting diodes are turned on or off.

22. A method of encoding and decoding a multi-state data stream in a system comprising a data transmitting station and at least one data receiving station coupled to the data transmitting station by a data transmission line, wherein the data stream is encoded in the transmission station by generating a first waveform the shape of which corresponds to the integral of a positive pulse having a negative d.c. offset and a second waveform the shape of which corresponds to the integral of a negative pulse having a positive d.c. offset, the time average of each pulse and its associated d.c. offset being substantially zero, sequentially reading each state of the data stream and assembling for transmission along the transmission line a composite waveform consisting of a respective combination of the first and second waveforms for each of the states read from the data stream, and wherein the composite waveform in the receiving station is decoded by differentiating to provide a bi-directional pulse train representing the multi-state data stream.

23. A method as claimed in claim 22 wherein each of said waveforms has a cycle length set at about 1 ms and the duration for each waveform is traverse between its positive and negative maxima is set at about one seventh of a millisecond.

* * * * *